United States Patent
Ellsworth et al.

(10) Patent No.: US 11,539,594 B2
(45) Date of Patent: *Dec. 27, 2022

(54) DIAGRAMMING CHLID NODES WITH MULTIPLE PARENT NODES

(71) Applicant: Lucid Software, Inc., South Jordan, UT (US)

(72) Inventors: Kevin Michael Ellsworth, Sandy, UT (US); Kevin Joseph Reece, South Jordan, UT (US); Jonathan Bronson, Salt Lake City, UT (US); Benjamin N. Dilts, Bluffdale, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,039

(22) Filed: May 4, 2022

(65) Prior Publication Data
US 2022/0263720 A1 Aug. 18, 2022

Related U.S. Application Data

(63) Continuation of application No. 17/176,975, filed on Feb. 16, 2021, now Pat. No. 11,336,532.

(51) Int. Cl.
*H04L 12/24* (2006.01)
*G06N 7/00* (2006.01)
(Continued)

(52) U.S. Cl.
CPC ............. *H04L 41/12* (2013.01); *G06N 7/005* (2013.01); *H04L 41/145* (2013.01); *H04L 41/22* (2013.01)

(58) Field of Classification Search
CPC ....... H04L 41/12; H04L 41/145; H04L 41/22; G06N 7/005
See application file for complete search history.

(56) References Cited

U.S. PATENT DOCUMENTS

| 7,954,083 B2 | 5/2011 | Berenbach et al. |
| 2004/0163044 A1 | 8/2004 | Nakano |

(Continued)

FOREIGN PATENT DOCUMENTS

| WO | 2007/103749 A1 | 9/2007 |

OTHER PUBLICATIONS

PCT International Search Report and Written Opinion issued in corresponding application No. PCT/US2022/015311, dated May 10, 2022.

*Primary Examiner* — Tonia L Dollinger
*Assistant Examiner* — Joseph M Cousins
(74) *Attorney, Agent, or Firm* — Maschoff Brennan

(57) ABSTRACT

In an example, a method to display a graphical diagram includes receiving source data that includes multiple nodes arranged in a directed acyclic graph (DAG) in which each child node of a set of child nodes has multiple DAG parent nodes. The nodes include the DAG parent nodes. The method includes converting the DAG to a tree in which each of the nodes has no more than one tree parent node. The method includes displaying, based on the tree, a graphical diagram in which child graphical objects that represent child nodes that each has multiple DAG parent nodes are positioned in intersection areas of container graphical objects that represent the DAG parent nodes.

24 Claims, 10 Drawing Sheets

(51) Int. Cl.
*H04L 41/12* (2022.01)
*H04L 41/14* (2022.01)
*H04L 41/22* (2022.01)

(56) References Cited

U.S. PATENT DOCUMENTS

| | | |
|---|---|---|
| 2005/0015755 A1 | 1/2005 | Holmes et al. |
| 2006/0244754 A1* | 11/2006 | Beda .................. G06T 15/005 345/557 |
| 2010/0198874 A1 | 8/2010 | Futatsugi |
| 2010/0306167 A1 | 12/2010 | Crawford et al. |
| 2019/0097890 A1 | 3/2019 | Zhang et al. |
| 2020/0004865 A1 | 1/2020 | Dilts et al. |
| 2020/0004866 A1 | 1/2020 | Dilts et al. |
| 2020/0004872 A1 | 1/2020 | Dilts et al. |
| 2020/0272608 A1 | 8/2020 | Dilts et al. |
| 2020/0311082 A1 | 10/2020 | Mayr et al. |

\* cited by examiner

DIAGRAMMING CHLID NODES WITH MULTIPLE PARENT NODES

CROSS-REFERENCE TO RELATED APPLICATION

This application is a continuation of U.S. application Ser. No. 17/176,975 filed Feb. 16, 2021, which is incorporated herein by reference in its entirety.

FIELD

The embodiments discussed herein are related to visualization of graphical nodes with multiple parent nodes.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate graphical diagrams on a computer based on the structured source data. When nodes in the structured source data have multiple incoming edges, or multiple parent nodes, it may be difficult to graphically represent the nodes in a graphical diagram.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a method to display a graphical diagram includes receiving source data that includes multiple nodes arranged in a directed acyclic graph (DAG) in which each child node of a set of child nodes has multiple DAG parent nodes. The nodes include the DAG parent nodes. The method includes converting the DAG to a tree in which each of the nodes has no more than one tree parent node. The method includes displaying, based on the tree, a graphical diagram in which child graphical objects that represent child nodes that each has multiple DAG parent nodes are positioned in intersection areas of container graphical objects that represent the DAG parent nodes.

In another example embodiment, a non-transitory computer-readable medium has computer-readable instructions stored thereon that are executable by a processor to perform or control performance of operations. The operations include receiving source data that includes multiple nodes arranged in a DAG in which each child node of a set of child nodes has multiple DAG parent nodes. The nodes include the DAG parent nodes. The operations include converting the DAG to a tree in which each of the nodes has no more than one tree parent node. The operations include displaying, based on the tree, a graphical diagram in which child graphical objects that represent child nodes that each has multiple DAG parent nodes are positioned in intersection areas of container graphical objects that represent the DAG parent nodes.

In another example embodiment, a system to display a graphical diagram includes a processor and a non-transitory computer-readable medium communicatively coupled to the processor and having computer-readable instructions stored thereon that are executable by the processor to perform or control performance of operations. The operations include receiving source data that includes multiple nodes arranged in a directed acyclic graph (DAG) in which each child node of a set of child nodes has multiple DAG parent nodes. The nodes include the DAG parent nodes. The operations include converting the DAG to a tree in which each of the nodes has no more than one tree parent node. The operations include displaying, based on the tree, a graphical diagram in which child graphical objects that represent child nodes that each has multiple DAG parent nodes are positioned in intersection areas of container graphical objects that represent the DAG parent nodes.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
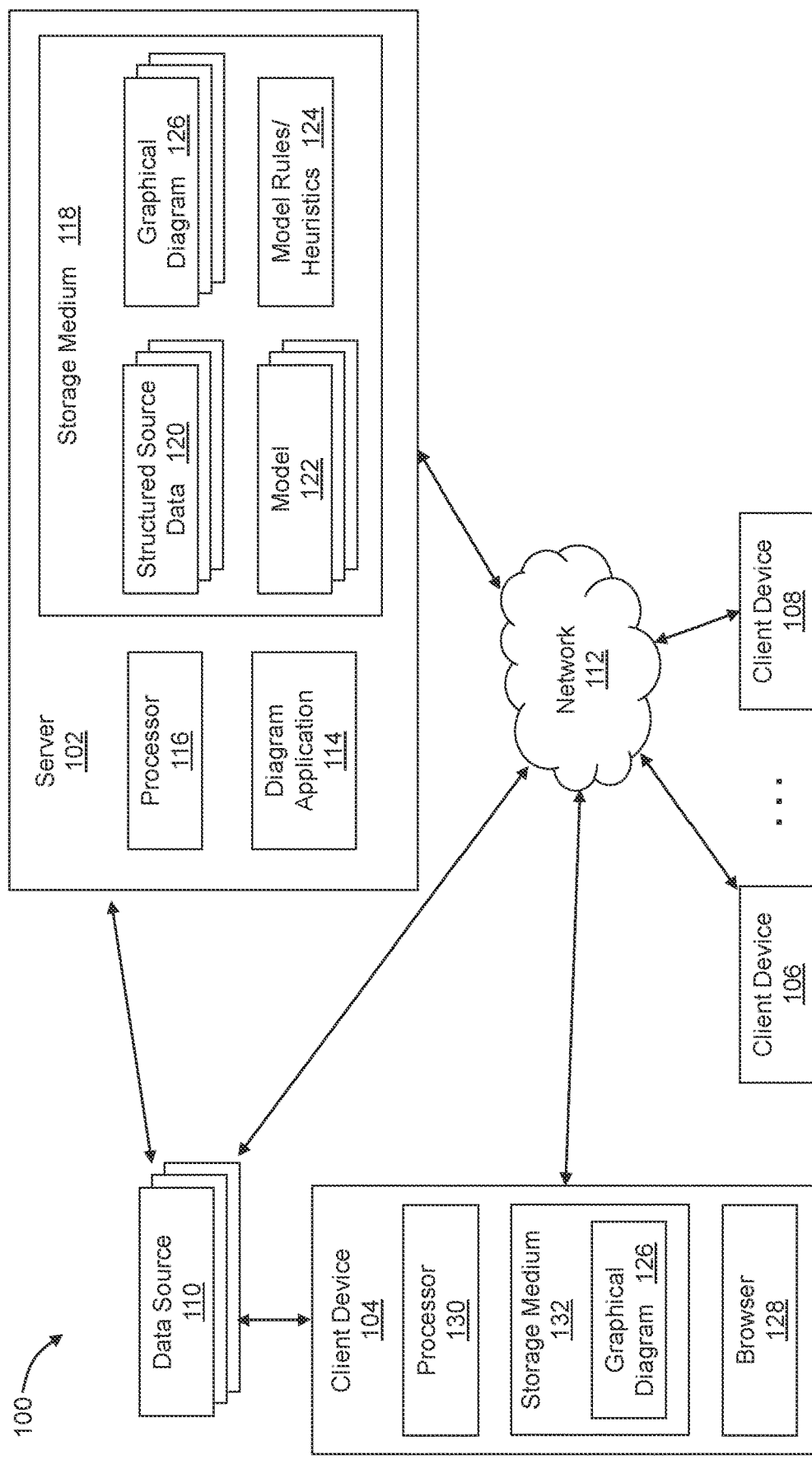
FIG. 1 is a block diagram of an example operating environment that includes a server and one or more client devices.

It is often useful to categorize objects in diagrams of complex data based on multiple categories. For example, if an object belongs to two different categories represented by two different containers, it may be useful to generate the diagram to show that the object belongs to both categories. One option is to position the containers to at least partially overlap each other in an intersection area and then place the object in the intersection area. Such an arrangement may clearly convey that the object belongs to both categories. While relatively straightforward to manually arrange a small diagram based on multiple categories in this manner, it is not straightforward to do so automatically and/or for complex source data.

Complex source data refers to source data that includes nodes where at least some child nodes each has multiple incoming edges or parent nodes. Embodiments described herein enable generation of graphical diagrams representing the source data where graphical objects that represent child nodes with multiple incoming edges or parent nodes may be arranged in intersection areas of container graphical objects that represent the parent nodes. The multiple parent nodes of a given child node may represent, include, or correspond to categories to which the child node belongs. In some implementations, two or more different types of categories overlap. First and second types of categories may be said to overlap where child nodes may belong to both a category of the first type and a category of the second type but not to two categories of the first type or two categories of the second type.

In these and other embodiments, the source data may include nodes arranged hierarchically, e.g., in a DAG. As used herein, a DAG is a directed graph of nodes connected by edges and containing no directed cycles. A subset of the nodes of the DAG, e.g., a set of child nodes, may each have multiple incoming edges/parent nodes. A given node may be both a child node (to one or more parent nodes above it) and a parent node (to one or more child nodes below it). The DAG may be converted to a tree in which each of the nodes has no more than one incoming edge or no more than one parent node. As used herein, a tree is a restricted version of a DAG where each node has no more than one incoming edge. A graphical diagram may be displayed based on the tree with multiple graphical objects that represent nodes of the source data. Displaying the graphical diagram based on the tree may include displaying a different child graphical object for each child node of the set of child nodes in a corresponding intersection area of two corresponding container graphical objects, the corresponding intersection area representing a corresponding intersection area node in the tree. For a given child node, the corresponding intersection area of the two corresponding container graphical objects is an intersection area of two container graphical objects that represent two parent nodes from each of which the child node has an incoming edge in the DAG. The corresponding intersection area node is an intersection area node in the tree from which the child node has an incoming edge.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1 is a block diagram of an example operating environment 100 that includes a server 102 and one or more client devices 104, 106, 108, arranged in accordance with at least one embodiment described herein. The server 102 and/or the client devices 104, 106, 108 may be configured to generate and display graphical diagrams or visualizations that include graphical objects based on structured source data. The terms graphical diagram and visualization are used interchangeably herein. In some embodiments, the server 102 and/or the client devices 104, 106, 108 may be configured to diagram child nodes with multiple parent nodes.

The structured source data may be received from one or more data sources 110. Each of the data sources 110 may include, for example, a cloud infrastructure provider such as AWS, GOOGLE CLOUD, or MICROSOFT AZURE; a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a database schema (e.g., to generate Entity Relationship Diagrams); a service-oriented architecture; physical network discovery tools; custom-built technical systems that can be modeled similar to a network; or other suitable data source and/or data collection. The data in each of the data sources 110 may have a specific format, which may be different and/or the same from one data source 110 to another. Some example data formats include proprietary formats, Structured Query Language (SQL), and JavaScript Object Notation (JSON).

The structured source data may identify two or more nodes or other entities and relationships among them. For instance, the structured source data may identify various compute nodes, storage nodes, database nodes, networking nodes (e.g., virtual private clouds (VPCs)), regions, availability zones (AZs), and/or other entities deployed by a customer in AWS as well as relationships among the entities, such as specific ports over which specific nodes can communicate or specific VPCs and/or AZs to which compute nodes belong. As another example, the structured source data may identify databases and tables within databases and/or other entities in a database schema as well as relationships among the entities, such as foreign and/or primary keys. As another example, the structured source data may identify employees, executives, owners and/or other personnel of a company as well as their relationships to each other, such as relative ranks and organization into one or more divisions, departments, or other logical units.

Each graphical diagram may graphically represent one or more of the nodes using one or more graphical objects. In particular, each node may be represented by or otherwise associated with a set of one or multiple graphical objects. For example, compute nodes and database nodes of AWS structured source data may each be represented by a corresponding graphical node in a graphical diagram. As another example, a node of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to.

The server 102 and/or the client devices 104, 106, 108 may be configured to automatically generate graphical diagrams based on the structured source data 120. The graphical diagrams may be generated based on contract maps. Alternatively or additionally, automatically-generated graphical diagrams or graphical objects therein may be customized by application of conditional formatting. In some embodiments, updates made to the graphical drawings, e.g., to graphical objects within the graphical drawings that represent the nodes, may be propagated back to the structured source data in some circumstances. Alternatively or additionally, the server 102 and/or the client devices 104, 106, 108 may be configured to apply one or more reversible data transforms to the structured source data when generating graphical diagrams. Additional details regarding contract maps, customization of graphical diagrams, conditional formatting, updating structured source data, and reversible data transforms are disclosed in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application (hereinafter application) 114 that allows the client devices 104, 106, 108 to generate and display graphical diagrams. In other embodiments, the application 114 may include a non-web-based application but may generally be described herein as a web-based application for simplicity. Alternatively or additionally, some or all of the functionality described as being performed by the diagram application 114 may be performed locally on the client devices 104, 106, 108, such as by a browser or other application executed by the client devices 104, 106, 108.

The server 102 may additionally include a processor 116 and a storage medium 118. The processor 116 may be of any type such as a central processing unit (CPU), a microprocessor ($\mu$P), a microcontroller ($\mu$C), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured source data 120, one or more models 122, model rules and/or heuristics 124 ("Model Rules/Heuristics" in FIG. 1), and/or one or more graphical diagrams 126. Each set of structured source data 120 may be imported from a corresponding one of the data sources 110. The structured source data 120 may be imported over the network 112 or directly from the corresponding data source 110 if a direct connection exists.

The model rules and/or heuristics 124 include rules and/or heuristics that may be applied to the structured source data 120 to derive information about the nodes and/or their relationships represented in the structured data. The structured source data 120 and/or the information derived by the model rules and/or heuristics 124 may be used by the server 102 to generate the models 122, each model 122 corresponding to a different set of structured source data 120. Each of the graphical diagrams 126 may be generated directly from a corresponding set of the structured source data 120 and/or from a corresponding one of the models 122 derived from the corresponding set of structured source data 120. The graphical diagrams 126 may be generated based on input received from users at the client devices 104, 106, 108 and may include some or all of the nodes or other entities represented in the corresponding set of structured source data 120 and/or in the corresponding model 122 derived from the corresponding set of structured source data 120.

Some nodes in the structured source data 120 may have multiple incoming edges, or multiple parent nodes, such that it may be difficult to graphically represent the nodes. For instance, various nodes (e.g., compute nodes, storage nodes, database nodes, networking nodes, and/or other entities) in structured source data from AWS may belong to one of multiple VPCs and one of multiple AZs. The VPC and the AZ of a given node are both parent nodes to the given node. It may be useful or desirable to generate a graphical diagram showing the nodes arranged in VPCs or AZs as containers. Typical diagramming applications may be unable to generate graphical diagrams showing the nodes organized into VPC/AZ containers where some or all of the nodes have multiple parent nodes, e.g., where at least some of the nodes belong to both a VPC container and an AZ container.

Alternatively, some typical diagramming applications may duplicate nodes and show the original nodes in the corresponding VPC container and the duplicate nodes in the corresponding AZ container, or vice versa. This solution fails to provide an accurate representation of the relationship of the nodes to the VPC and AZ containers or an accurate representation of the number of nodes in the data set. The foregoing problem is not limited to nodes in structured source data from AWS where at least some of the nodes have both a VPC and an AZ as parent nodes but more generally extends to nodes in any structured source data that have multiple parent nodes. Some embodiments described herein address the foregoing problem generally by modifying a hierarchical arrangement of the nodes of the source data from a DAG in which some nodes may have multiple nodes to a tree in which each node has not more than one parent node.

In some embodiments, the server 102 may be configured to cooperate with the client devices 104, 106, 108 to allow the client devices 104, 106, 108 to generate and display graphical diagrams 126 that represent source data with child nodes that have multiple parent nodes, e.g., where at least some graphical objects that represent the child nodes are arranged in overlapping types of categories that represent the parent nodes. The graphical diagrams may be generated directly from the structured source data 120 and/or the models 122 derived from the structured source data 120. In these and other embodiments, client devices 104, 106, 108 may use a corresponding application or app, such as a browser 128, to generate the graphical diagrams 126, which may be displayed on a display of the corresponding client device 104, 106, 108.

Accordingly, each of the client devices 104, 106, 108 may execute an application, such as the browser 128, configured to communicate through the network 112 with the server 102. The browser 128 may include an Internet browser or other suitable application for communicating through the network 112 with the server 102. The browser 128 may generate, download and/or interact with structured source data 120 and/or graphical diagrams 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 116 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram 126, some of a corresponding set of structured source data 120 or model 122, and/or other content obtained from the server 102 and/or generated locally on the client device 104.

Embodiments described herein are not limited to using a browser to communicate with the server 102 to generate and display graphical diagrams 126 and group and collapse graphical objects therein. For example, rather than or in addition to a browser, the client devices 104, 106, 108 may include a native app as are often used on client devices such as mobile devices including smartphones and tablet computers. Accordingly, embodiments described herein generally include generating and displaying graphical diagrams and grouping and collapsing graphical objects therein using a browser, a native app, or another suitable application on the client devices 104, 106, 108.

The source data 120 used to generate graphical diagrams 126 may generally include multiple nodes arranged in a DAG in which each node of a set of child nodes have multiple incoming edges or parent nodes. In some embodiments, the DAG may be converted to a tree, e.g., at the server device 102 or the client device 104, in which each of the nodes has no more than one incoming edge or parent node. The graphical diagram 126 may then be displayed based on the tree with multiple graphical objects representing nodes of the source data 120. The graphical diagram 126 may include a different child graphical object for each child node of the set of child nodes displayed in a corresponding intersection area of two corresponding container graphical objects. Displaying the child graphical objects in the intersection areas may visually convey that a given child graphical object, or the child node it represents, belongs to both of the container graphical objects, or the parent nodes or categories they represent.

Figure 2:
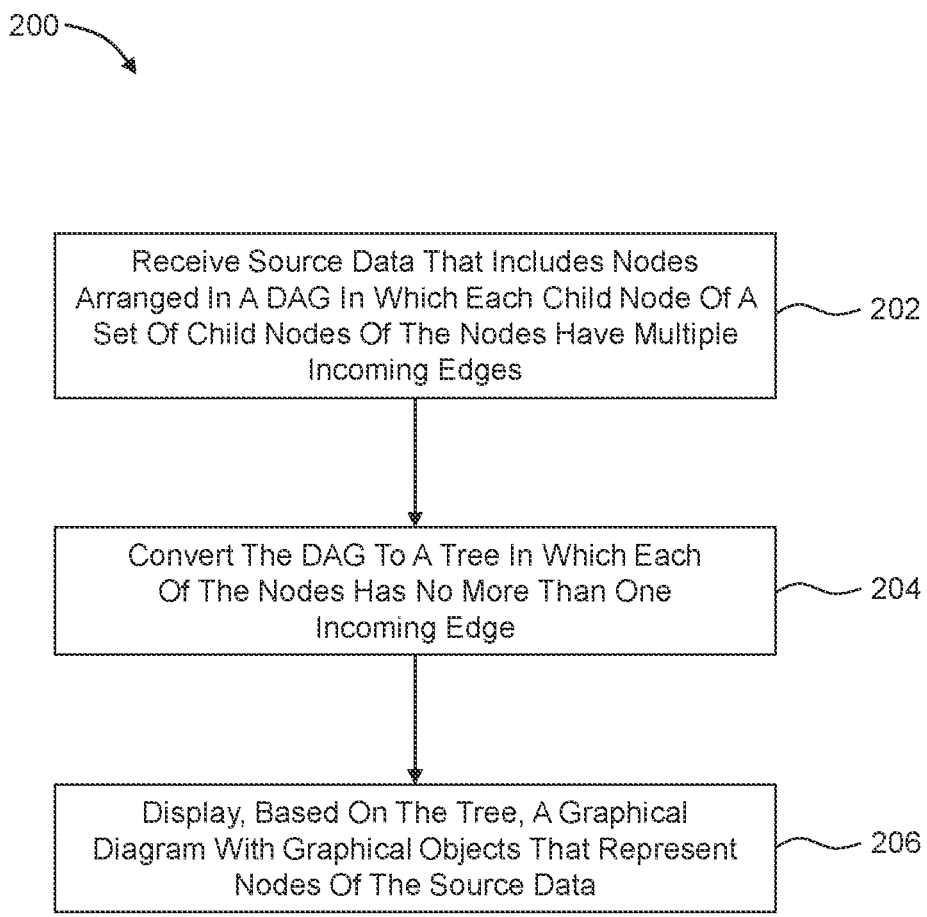
FIG. 2 is a flowchart of a method to display a graphical diagram.

FIG. 2 is a flowchart of a method 200 to display a graphical diagram, arranged in accordance with at least one embodiment described herein. The method 200 may be programmably performed or controlled by a processor in, e.g., a computer and/or server that executes a browser, diagram application, and/or other application to generate graphical diagrams based on structured data. In an example implementation, the method 200 may be performed in whole or in part by the server 102 and/or the client device 104 of FIG. 1. The method 200 may include one or more of blocks 202, 204, and/or 206.

At block 202, the method 200 includes receiving source data that includes nodes arranged in a DAG in which a set of child nodes of the nodes have multiple incoming edges or parent nodes. Block 202 may be followed by block 204.

At block 204, the method 200 includes converting the DAG to a tree in which each of the nodes has no more than one incoming edge or parent node. Converting the DAG to the tree at block 204 may include identifying first and second parent nodes in the DAG that each has an outgoing edge to a first child node of the set of child nodes. Converting the DAG to the tree at block 204 may include inserting a first intersection area node in the tree between the first parent node and the first child node such that the first intersection area node has an incoming edge from the first parent node and an outgoing edge to the first child node. Converting the DAG to the tree at block 204 may include removing the outgoing edge of the second parent node to the first child node in the tree. An example of converting a DAG to a tree is described with respect to FIG. 3. Block 204 may be followed by block 206.

At block 206, the method 200 includes displaying, based on the tree, a graphical diagram with graphical objects that represent nodes of the source data. Block 206 may include displaying a different child graphical object for each child node of the set of child nodes in a corresponding intersection area of two corresponding container graphical objects, the corresponding intersection area representing a corresponding intersection area node in the tree. For a given child node, the corresponding intersection area of the two corresponding container graphical objects may be an intersection area of two container graphical objects that represent two parent nodes from each of which the child node has an incoming edge in the DAG. Additionally, the corresponding intersection area node may be an intersection area node in the tree from which the child node has an incoming edge.

As an example of block 206, consider a first child node represented by a first child graphical object, the first child node having in the DAG a first incoming edge from a first parent node and a second incoming edge from a second parent node. In this example, the first child graphical object may be displayed within an intersection area, e.g., an area where the first and second container graphical objects intersect or overlap each other. The displayed intersection area may represent an intersection area node in the tree. Other child graphical objects may similarly be displayed in corresponding intersection areas.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

For example, the set of child nodes may include a first child node represented by a first child graphical object and a second child node represented by a second child graphical object. The nodes may further include a first parent node represented by a first container graphical object, a second parent node represented by a second container graphical object, and a third parent node represented by a third container graphical object. The first and second child nodes may be at a first level of the DAG. The first, second, and third parent nodes may be at a second level of the DAG immediately above the first level. The tree may have a third level of nodes between the first level and the second level, the third level of nodes including intersection area nodes. The first child node may have an incoming edge from each of the first and second parent nodes in the DAG and a single incoming edge from a first intersection area node represented by a first intersection area of the first container graphical object and the second container graphical object such that displaying the graphical diagram based on the tree at block 206 includes displaying the first graphical object within the first intersection area. The second child node has an incoming edge from each of the first and third parent nodes in the DAG and a single incoming edge from a second intersection area node represented by a second intersection area of the first container graphical object and the third container graphical object such that displaying the graphical diagram based on the tree at block 206 includes displaying the second graphical object within the second intersection area.

In some implementations, the DAG may have child nodes with multiple incoming edges at multiple levels. In such a situation, it may be difficult or impossible to display all child graphical objects of child nodes that have multiple parent nodes and multiple grandparent nodes (or other ancestors at the same level) in a single location of the diagram. Instead, some embodiments may duplicate at least some of the child graphical objects and/or overlapping parent container graphical objects in which they appear in multiple grandparent container graphical objects. More generally, referring to the method 200 of FIG. 2, the nodes may further include a first ancestor node represented by a fourth container graphical object and a second ancestor node represented by a fifth container graphical object. The first and second parent nodes or a direct ancestor node of each of the first and second parent nodes may have an incoming edge from each of the first and second ancestor nodes in the DAG. In this and other embodiments, displaying the first graphical object within the first intersection area may include displaying the first graphical object within the first intersection area of the first container graphical object and the second container graphical object all within the fourth container graphical object. In addition, displaying the graphical diagram based on the tree may further include displaying a duplicate of at least some of the first container graphical object, the second container graphical object, and the first graphical object within the first intersection area of the first container graphical object and the second container graphical object all within the fifth container graphical object.

In some embodiments, some child nodes at the first level of the complex and trees may have a single incoming edge or parent node, rather than multiple incoming edges or parent nodes. For example, a third child node at the first level of the complex and trees may be represented in the graphical diagram as a third child graphical object. The third child node may have a single incoming edge in the DAG, the single incoming edge coming from the first parent node. Displaying the graphical diagram based on the tree at block 206 may include displaying the third child graphical object within the first container graphical object in an area that does not intersect container graphical objects that represent any other parent nodes at the second level of the tree.

In an example implementation, the source data includes AWS data that includes child nodes such as subnets and parent nodes such as AZs and VPCs. In this and other examples, displaying the graphical diagram at block 206 may include displaying first container graphical objects aligned in a first direction, each of the first container graphical objects representing a different one of the AZs. Alternatively or additionally, displaying the graphical diagram at block 206 may include displaying second container graphical objects aligned in a second direction and positioned such that each of the second container graphical objects intersects each of the first container graphical objects, each of the second container graphical objects representing a different one of the VPCs. Alternatively or additionally, displaying the graphical diagram at block 206 may include representing subnets belonging to the set of child nodes as child graphical objects within intersection areas of the first container graphical objects with the second container graphical objects in dependence on the corresponding intersection area node of the tree from which each of the corresponding subnets has a single incoming edge. Each of the subnets may have in the DAG an incoming edge from both one of the AZs and one of the VPCs.

In some embodiments, graphical diagrams generated and displayed according to the method 200 may have substantial amounts of whitespace. For example, some overlapping container graphical objects may not have any child graphical objects in their intersection areas. Accordingly, some embodiments may at least partially collapse whitespace in the diagram, e.g., by moving intersection areas occupied by child graphical objects to intersection areas that are unoccupied by child graphical objects. More generally, the method 200 of FIG. 2 may further include one or more of the following operations. For example, the method 200 may include laying out a grid of first and second container graphical objects. The first container graphical objects may be aligned in a row of the grid and the second container graphical objects may be aligned in a column of the grid such that the row of first container graphical objects intersects the column of second container graphical objects. The method 200 may include allocating child graphical objects that represent child nodes of the set of child nodes into intersection areas of the first container graphical objects with the second container graphical objects based on a pair of a corresponding one of the first container graphical objects and a corresponding one of the second container graphical objects to which each of the child graphical objects belongs. A child graphical object may be said to "belong" to a container graphical object when the child node represented by the child graphical object has an incoming edge from a parent node represented by the container graphical object. The method 200 may include determining an amount of space to display each of the intersection areas in the corresponding container graphical objects based on the child graphical objects allocated to each of the intersection areas. The method 200 may include, in response to determining that a subset of the intersection areas is unoccupied by child graphical objects; condensing the grid by moving one or more intersection areas occupied by one or more child graphical objects to at least some of the subset of intersection areas unoccupied by child graphical objects. In this and other embodiments, displaying the graphical diagram at block 206 may include displaying graphical objects according to the condensed grid. An example of partially collapsing a graphical diagram is described with respect to FIGS. 7A and 7B.

Figure 3:
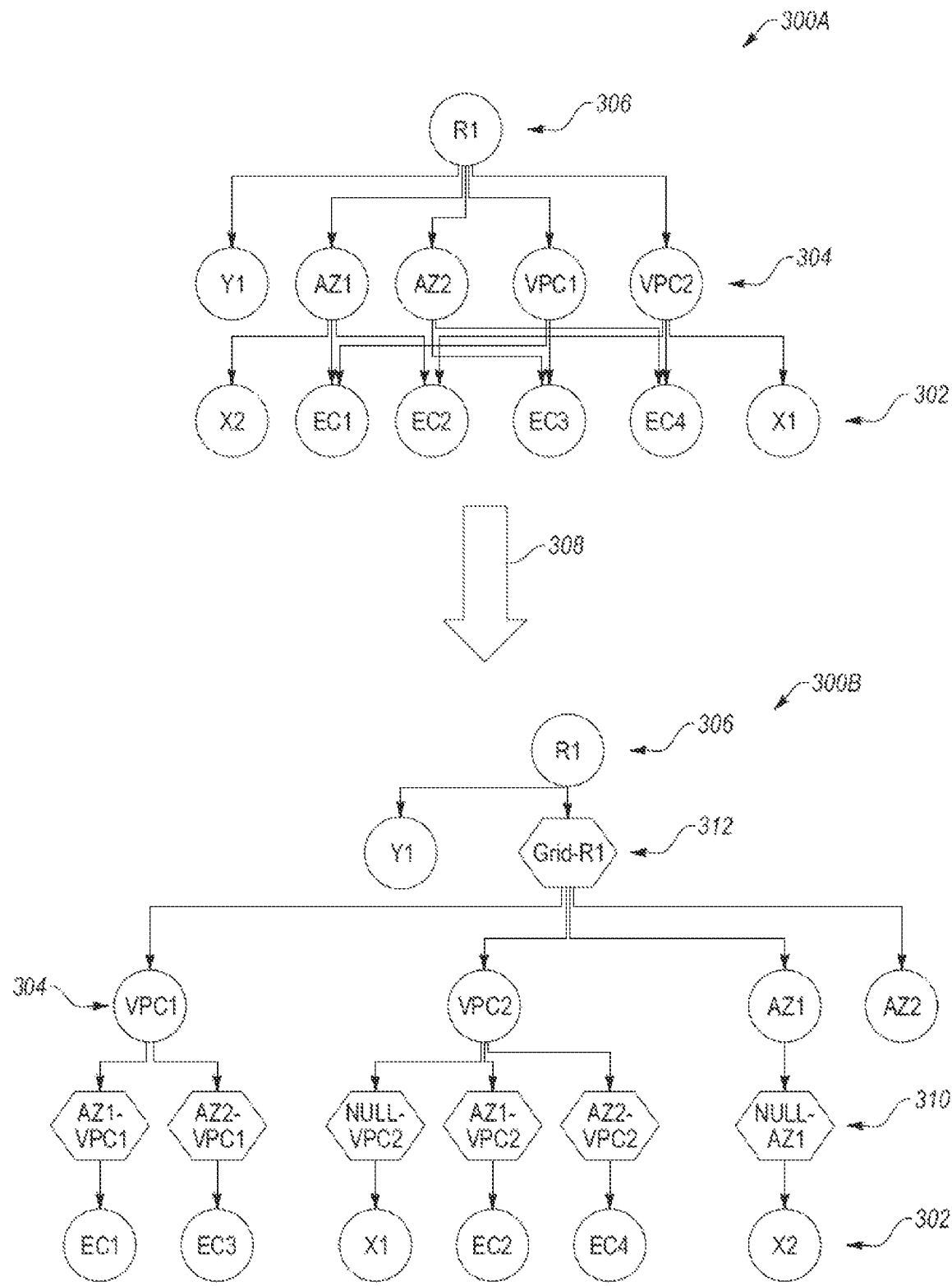
FIG. 3 illustrates an example DAG of nodes from which a graphical diagram may be generated.

An example of converting a DAG to a tree, e.g., at block 204 in FIG. 2, will now be described with respect to FIG. 3. FIG. 3 illustrates an example DAG 300A of nodes from which a graphical diagram may be generated, arranged in accordance with at least some embodiments described herein. The DAG 300A may be included in or derived from source data, such as the structured source data 120 of FIG. 1. The source data of FIG. 3 specifically includes AWS source data and the nodes include nodes X1, X2, and elastic compute cloud nodes EC1, EC2, EC3, and EC4 at a first level 302 of a hierarchy of the DAG 300A. The source data additionally includes multiple types of nodes at a second level 304 of the hierarchy immediately above the first level, the types of nodes including AZ nodes AZ1 and AZ2; VPC nodes VPC1 and VPC2; and a node Y1. Each of the nodes X1, X2, Y1 represents any of a variety of nodes, such as S3 buckets (storage), SQS Queues, SNS Topics, API Gateways, EBS Volumes, or other suitable nodes. Finally, the source data additionally includes a region node R1 (or multiple region nodes or other type(s) of nodes) at a third level 306 of the hierarchy immediately above the second level. In other embodiments, the DAG 300A may have additional levels and/or other nodes, such as other region nodes, one or more account nodes in a level above the region node(s), or the like.

In the example of FIG. 3, the AZ and VPC types of nodes or categories overlap. That is, a given child node, e.g., in the first level 302 immediately below the second level 304 of the hierarchy that includes the AZ and VPC types of nodes, may be a child of both one of the AZ nodes and one of the VPC nodes. For instance, the EC1 node is a child of or has an incoming edge from both the AZ1 node and the VPC1 node; the EC2 node is a child of both the AZ1 node and the VPC2 node; the EC3 node is a child of both the AZ2 node and the VPC1 node; and the EC4 node is a child of both the AZ2 node and the VPC2 node.

According to some embodiments herein, the DAG 300A may be converted to a tree 300B as indicated at 308, e.g., at block 204 of the method 200 of FIG. 2, to enable visualization of child graphical objects in overlapping types of categories or containers. The tree 300B is hierarchically arranged with the first, second, and third levels 302, 304, 306 and one or more additional levels such as a fourth level 310 and a fifth level 312. The fourth level 310 includes intersection area nodes AZ1-VPC1, AZ2-VPC1, NULL-VPC2, AZ1-VPC2, AZ2-VPC2, and NULL-AZ1. The fifth level 312 includes a grid node grid-R1.

Converting the DAG 300A to the tree 300B may include identifying levels of the DAG 300A that include child nodes where at least one of the child nodes has two (or more) incoming edges or parent nodes. In this example, the first level 302 of the DAG 300A is identified as such a level since the EC1-EC4 nodes each has two incoming edges or parent nodes. For each such level, the method 200 may then insert intersection area nodes (the nodes of the fourth level 310 in this example) between the identified level (the first level 302 in this example) and the next level up (the second level 304 in this example).

The method 200 may additionally insert a grid node (the grid-R1 node in this example) between at least a portion of the next level up (the second level 304 in this example) and the level that is two levels up (the third level 306 in this example) from the identified level. In this example, the grid-R1 node is not placed between the R1 node and the Y1 node since the node Y1 does not have any nodes in the identified level (the first level 302 in this example). Thus, the Y1 node is moved up one level to the fifth level 312 in the tree 300B.

Figure 4A:
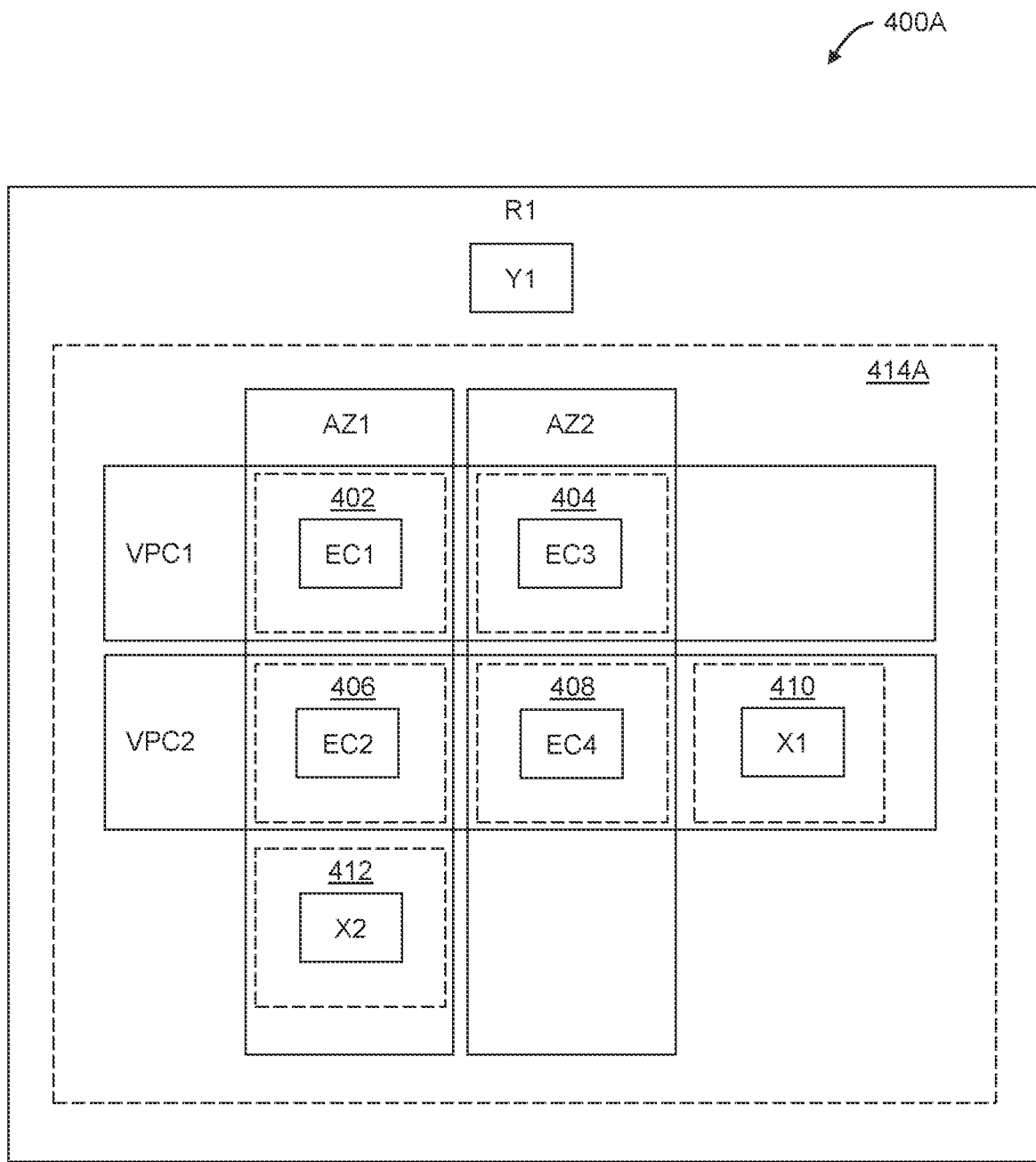
FIGS. 4A and 4B are example graphical diagrams that may be generated based on a tree of FIG. 3.
Figure 4B:
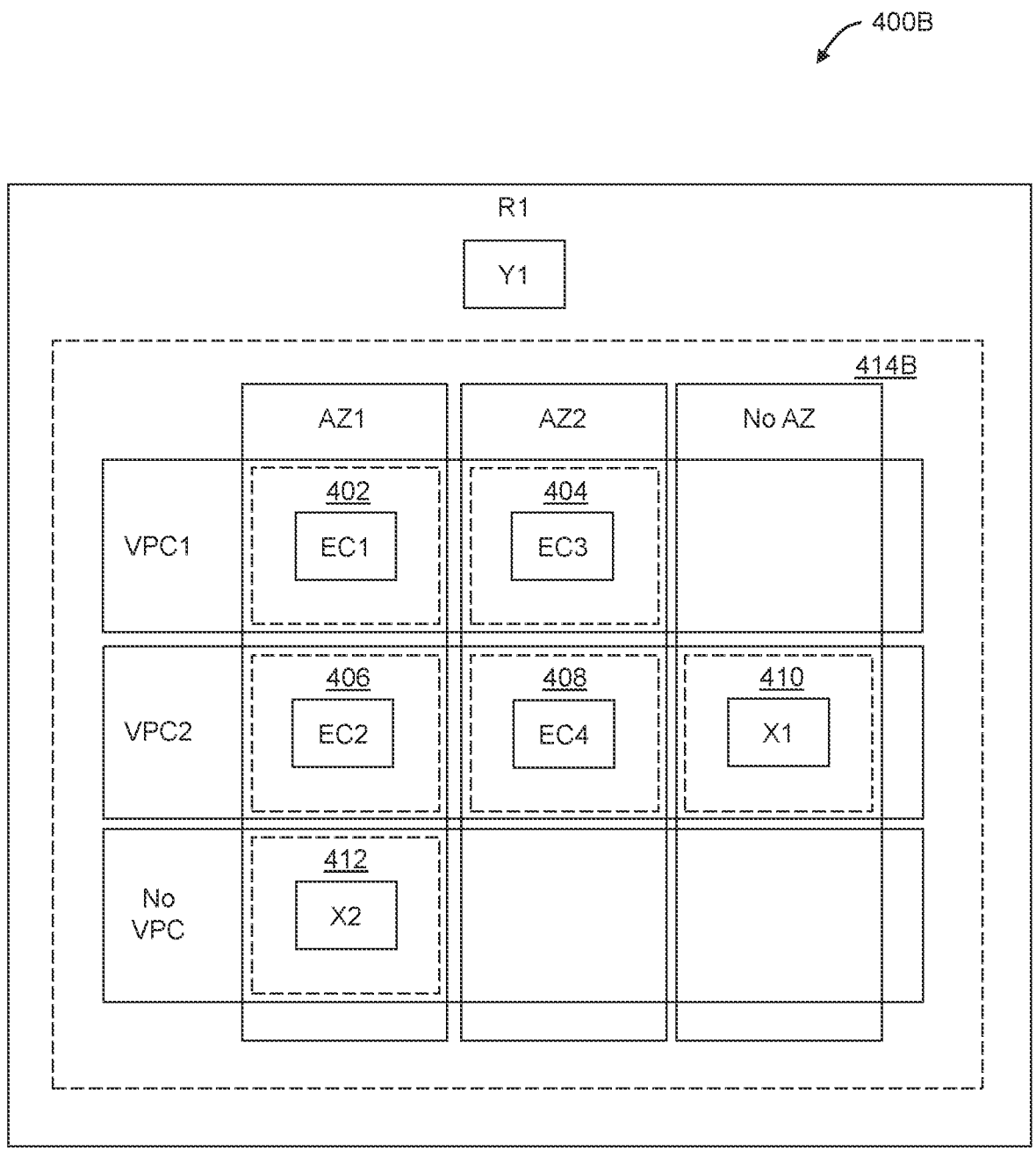

FIG. 4A is an example graphical diagram 400A (hereinafter "diagram 400A") that may be generated based on the tree 300B of FIG. 3, arranged in accordance with at least one embodiment described herein. FIG. 4B is another example graphical diagram 400B (hereinafter "diagram 400B") that may be generated based on the tree 300B of FIG. 3, arranged in accordance with at least one embodiment described herein. The diagrams 400A, 400B may be collectively referred to as diagrams 400 and may be displayed to a user, e.g., by outputting the diagrams 400 to a display of the client devices 104, 106, 108 of FIG. 1. Each of the diagrams 400 includes various graphical objects, including various container graphical objects that represent parent nodes in the second and third levels 304, 306 of the tree 300B and various child graphical objects that represent child nodes in the first level 302 of the tree 300. The container graphical objects include R1, VPC1, VPC2, AZ1, and AZ2 containers that respectively represent the R1, VPC1, VPC2, AZ1, and AZ2 nodes of the tree 300B. The child graphical objects include EC1-EC4, X1, and X2 objects that respectively represent the EC1-EC4, X1, and X2 nodes of the tree 300B. FIG. 4A will be referenced in the following ongoing discussion of FIGS. 2 and 3.

The method 200 may generate an intersection area node for each pair of different type nodes in the next level up (the second level 304 in this example) that is beneath a grid node (the grid-R1 node in this example) and that has a child node in the first level 302, resulting in four intersection area nodes AZ1-VPC1, AZ2-VPC1, AZ1-VPC2, and AZ2-VPC2 in this example. The intersection area nodes are then inserted between one of the corresponding parent nodes and the corresponding child node, e.g., at the fourth level 310. The incoming edge in the DAG 300A between the other corresponding parent node and the corresponding child node may be removed. For example, the pair of different type nodes that includes the AZ1 node and the VPC1 node has the EC1 node as a child in the DAG 300A. As such, in the tree 300B, the AZ1-VPC1 intersection area node is generated and placed between the VPC1 node and the EC1 node and the incoming edge from the AZ1 node to the EC1 node is removed. Accordingly, the EC1 node which has multiple incoming edges in the DAG 300A has only a single incoming edge in the tree 300B. When the diagram 400A or 400B is displayed based on the tree 300B, each of the four intersection area nodes AZ1-VPC1, AZ2-VPC1, AZ1-VPC2, and AZ2-VPC2 is represented by a corresponding intersection area 402, 404, 406, 408 of two corresponding container graphical objects, each intersection area 402, 404, 406, 408 including child graphical object(s) (e.g., EC1-EC4 objects) that represent the child node(s) beneath the intersection area node in the tree 300B.

In some embodiments, the intersection areas 402, 404, 406, 408 and other intersection areas discussed herein may have a visible outline when displayed. In some embodiments, the intersection areas 402, 404, 406, 408 and other intersection areas herein lack a visible outline when displayed as each may be placed where two containers with visible outlines cross each other such that a visible outline for the intersection area itself may be redundant.

In some embodiments, one of the two types of nodes in the next level up (the second level 304 in this example) may be designated as a default type of parent node under which intersection area nodes are inserted between the parent nodes in the next level up and the child nodes in the identified level (the first level 302 in this example). The incoming edge from the other type of parent node to the child node may be the incoming edge that is removed when converting the DAG 300A to the tree 300B. In the example of FIG. 3, the VPC nodes are designated as the default type of nodes and the AZ nodes are the other nodes. As such, in the tree 300B, the intersection area nodes AZ1-VPC1, AZ2-VPC1, AZ1-VPC2, and AZ2-VPC2 are inserted between the VPC nodes (VPC1, VPC2) and the compute nodes EC1-EC4 while the incoming edges from the AZ nodes to the compute nodes EC1-EC4 are removed.

The method 200 may also generate a null intersection area node to place between each node beneath the grid node (the grid-R1 node in this example) that is at the next level up (the second level 304 in this example) and corresponding nodes in the identified level (the first level 302 in this example) that have a single parent, resulting in null intersection area nodes NULL-VPC2 and NULL-AZ1. The null intersection area nodes may be inserted in the tree 300B between the corresponding child node (X1 or X2 in this example) and the corresponding parent node (VPC2 or AZ1 in this example). Each of the null intersection area nodes NULL-VPC2 and NULL-AZ1 is represented in the diagrams 400 by a corresponding null intersection area 410, 412, each null intersection area 410, 412 including child graphical object(s) (e.g., X1 and X2 objects) that represent the child node(s) beneath the null intersection area node in the tree 300B.

The method 200 then lays out a grid for the grid-R1 node. An example grid is denoted at 414A in FIG. 4A and 414B in FIG. 4B. The grid may or may not have a visible outline. The grid includes first container graphical objects aligned in a row of the grid and second container graphical objects aligned in a column of the grid such that the row of first container graphical objects intersects the column of second container graphical objects. In the examples of FIGS. 4A and 4B, the first container graphical objects aligned in the row include the AZ1 and AZ2 containers and the second container graphical objects aligned in the column include the VPC1 and VPC2 containers. More generally, the default type of nodes in the next level up (the second level 304 in this example) may be represented by either the first container graphical objects or the second container graphical objects. The other type of nodes may be represented by the other of the second container graphical objects or the first container graphical objects. For simplicity in the discussion that follows, the parent nodes that are the default type (VPC nodes in this example) are represented by the second container graphical objects aligned in the column and the parent nodes that are the other type (AZ nodes in this example) are represented by the first container graphical objects aligned in the row.

In some embodiments such as FIG. 4A, the grid includes N first container graphical objects, where N is a number of nodes of the other type in the next level up (second level 304 in this example), and M second container graphical objects, where M is a number of nodes of the default type in the next level up. In the example of FIG. 4A, the grid 414 includes two AZ containers and two VPC containers. The intersection areas 402, 404, 406, 408 and null intersection areas 410, 412 are arranged within each of the VPC or AZ containers to which the intersection areas correspond or belong. For example, since the intersection area 402 represents the intersection area node AZ1-VPC1 in the tree 300B, the intersection area 402 is positioned within each of the AZ1 and VPC1 containers, e.g., where the two containers intersect. Since the intersection area 404 represents the intersection area node AZ2-VPC1 in the tree 300B, the intersection area 404 is positioned within each of the AZ2 and VPC1 containers. Since the intersection area 406 represents the intersection area node AZ1-VPC2 in the tree 300B, the intersection area 406 is positioned within each of the AZ1 and VPC2 containers. Since the intersection area 408 represents the intersection area node AZ2-VPC2 in the tree 300B, the intersection area 408 is positioned within each of the AZ2 and VPC2 containers. Since the null intersection area 410 represents the null intersection area node NULL-VPC2 in the tree 300B, the intersection area 410 is positioned within the VPC2 container and outside any of the AZ containers. Since the null intersection area 412 represents the null intersection area node NULL-AZ1 in the tree 300B, the intersection area 410 is positioned within the AZ1 container and outside any of the VPC containers.

In other embodiments such as FIG. 4B, the grid includes N+1 first container graphical objects and M+1 second container graphical objects. The additional first or second container graphical object in this or other embodiments may be used as a container for child graphical objects that represent nodes that have a single parent node in the next level up (the second level 304 in this example). For example, in FIG. 4B, the diagram 400B additionally includes a No AZ container in the row of AZ containers and a No VPC container in the column of VPC containers.

The No AZ container may be for child graphical objects representing child nodes in the tree 300B that have incoming edges exclusively from VPC nodes. Since the null intersection area 410 for the X1 node that has only a VPC parent node represents the null intersection area node NULL-VPC2 in the tree 300B, the null intersection area 410 and the X1 object are positioned within each of the No AZ and VPC2 containers. Since the null intersection area 412 for the X2 node that has only an AZ parent node represents the null intersection area node NULL-AZ1 in the tree 300B, the null intersection area 410 and the X2 object are positioned within each of the No VPC and AZ1 containers.

Figure 5:
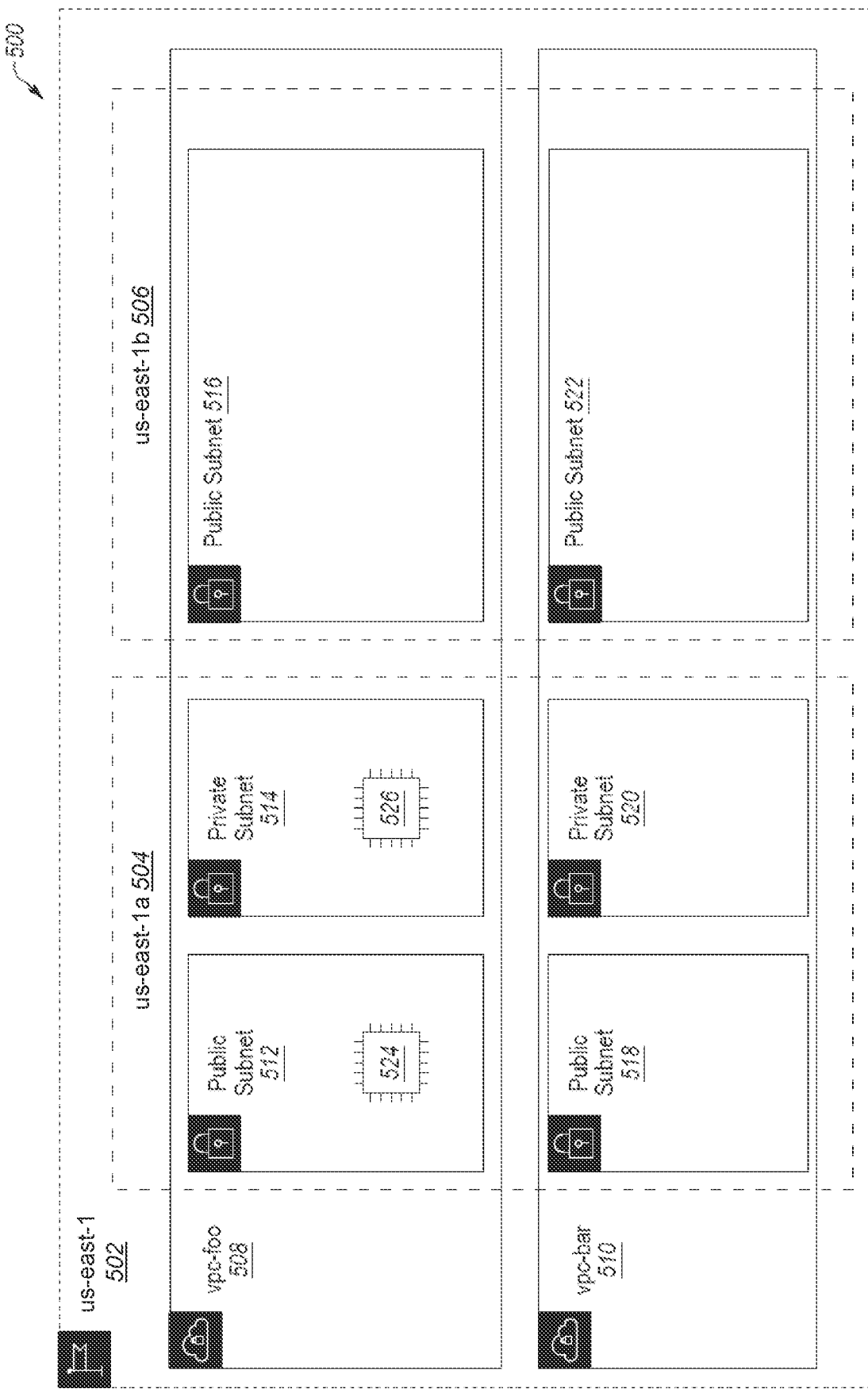
FIG. 5 is an example graphical diagram that may be generated based on a tree.

FIG. 5 is an example graphical diagram 500 (hereinafter "diagram 500") that may be generated based on a tree, arranged in accordance with at least one embodiment described herein. The diagram 500 may be displayed to a user, e.g., by outputting the diagram 500 to a display of the client devices 104, 106, 108 of FIG. 1. The diagram 500 includes various graphical objects, including various container graphical objects that represent parent nodes in the tree and a corresponding DAG and various child graphical objects that represent child nodes in the tree and the DAG. The container graphical objects include a region container 502, AZ containers 504, 506, and VPC containers 508, 510 that respectively represent a region node us-east-1, AZ nodes us-east-1a and us-east-1b, and VPC nodes vpc-foo and vpc-bar in the complex and trees. The child graphical objects include subnet graphical objects 512, 514, 518, 520, 522, 524 that represent subnet nodes in the complex and trees. Each of the subnet graphical objects 512, 514 includes a compute node graphical object 524, 526 contained therein. The compute node graphical object 524 represents a compute node in the simple and DAGs that has an incoming edge from the subnet node in the simple and DAGs that is represented by the subnet graphical object 512. Similarly, the compute node graphical object 526 represents a compute node in the simple and DAGs that has an incoming edge from the subnet node in the simple and DAGs that is represented by the subnet graphical object 514.

In graphical diagrams according to some embodiments, line attributes of containers may be configured to identify or differentiate between containers of different types of nodes. Examples of line attributes include line type (e.g., solid, dashed, dot-dash, dot-dot-dash, etc.), line color, and line weight. For example, in FIG. 5, the region container 502 has a dot line type, each of the AZ containers 504, 506 has a short dash line type, and each of the VPC containers 508, 510 has a solid line type.

Figure 6:
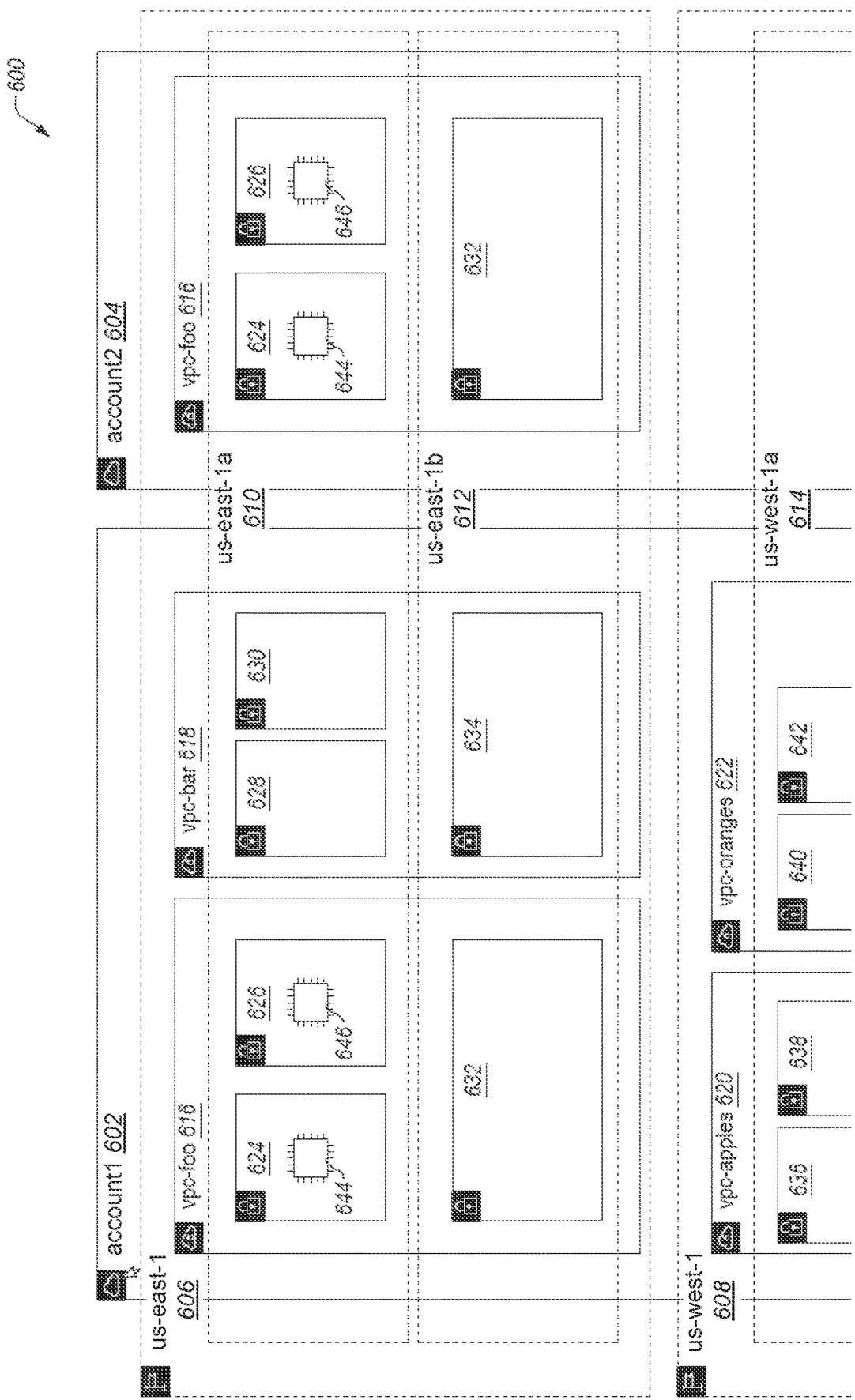
FIG. 6 is another example graphical diagram that may be generated based on a tree.

FIG. 6 is another example graphical diagram 600 (hereinafter "diagram 600") that may be generated based on a tree, arranged in accordance with at least one embodiment described herein. The diagram 600 may be displayed to a user, e.g., by outputting the diagram 600 to a display of the client devices 104, 106, 108 of FIG. 1. The diagram 600 includes various graphical objects, including various container graphical objects that represent parent or other nodes in the tree and a corresponding DAG and various child graphical objects that represent child nodes in the tree and the DAG. The container graphical objects include account containers 602, 604, region containers 606, 608, AZ containers 610, 612, 614, and VPC containers 616, 618, 620, 622 that respectively represent account nodes account1 and account2, region nodes us-east-1 and us-west-1, AZ nodes us-east-1a, us-east-1b, us-west-1a, and VPC nodes vpc-foo, vpc-bar, vpc-apples, vpc-oranges in the complex and trees. The child graphical objects include subnet graphical objects 624, 626, 628, 630, 632, 634, 636, 638, 640, 642 that represent subnet nodes in the complex and trees. Each of the subnet graphical objects 624, 626 includes a compute node graphical object 644, 646 contained therein. The compute node graphical object 644 represents a compute node in the simple and DAGs that has an incoming edge from the subnet node in the simple and DAGs that is represented by the subnet graphical object 624. Similarly, the compute node graphical object 646 represents a compute node in the simple and DAGs that has an incoming edge from the subnet node in the simple and DAGs that is represented by the subnet graphical object 626.

In the DAG (not shown) that corresponds to FIG. 6, there are multiple levels of the DAG that have child nodes with multiple incoming edges. For example, all of the subnet nodes represented by subnet objects 624, 626, 628, 630, 632, 634, 636, 638, 640, 642 in FIG. 6 have multiple incoming edges in the DAG, including one incoming edge from a corresponding one of the VPC nodes and one incoming edge from a corresponding one of the AZ nodes. At the next level up in the hierarchy of the DAG, all of the AZ nodes represented by AZ containers 610, 612, 614 in FIG. 6 have multiple incoming edges in the DAG, including one incoming edge from a corresponding one of the region nodes and one incoming edge from a corresponding one of the account nodes. Similarly, all of the VPC nodes represented by VPC containers 616, 618, 620, 622 in FIG. 6 have multiple incoming edges in the DAG, including one incoming edge from a corresponding one of the region nodes and one incoming edge from a corresponding one of the account nodes.

In addition, the VPC node vpc-foo represented by the VPC container 616 in FIG. 6 has multiple incoming edges in the DAG from two of the same type of parent node, including one incoming edge from each of the account nodes account1 and account2. Thus, in FIG. 6, the VPC container 616 and its contents are duplicated in the account container 604.

Figure 7A:
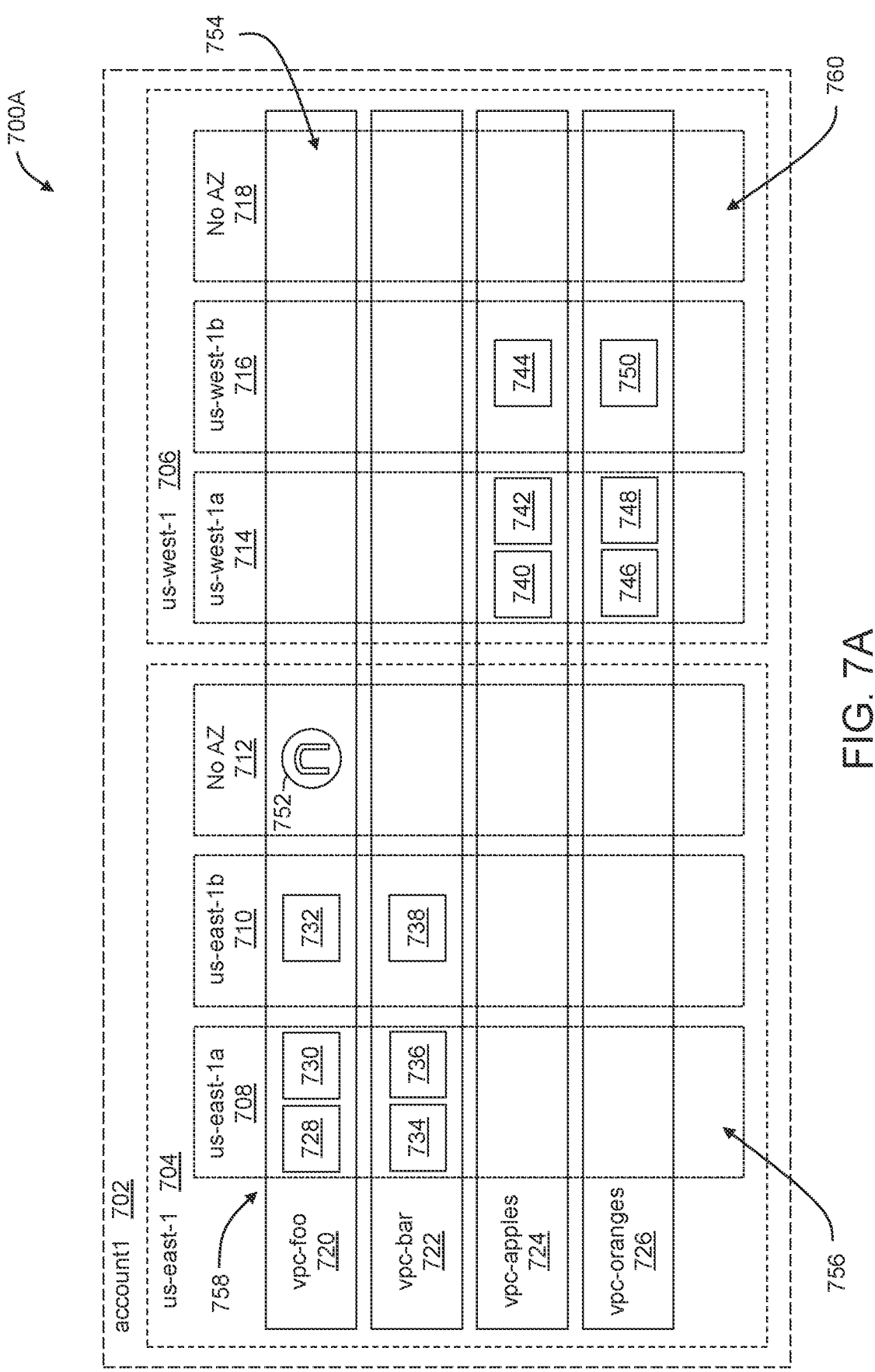
FIG. 7A is another example graphical diagram that may be generated based on a tree.

FIG. 7A is another example graphical diagram 700A (hereinafter "diagram 700A") that may be generated based on a tree, arranged in accordance with at least one embodiment described herein. The diagram 700A may be displayed to a user, e.g., by outputting the diagram 700A to a display of the client devices 104, 106, 108 of FIG. 1. The diagram 700A includes various graphical objects, including various container graphical objects that represent parent or other nodes in the tree and a corresponding DAG and various child graphical objects that represent child nodes in the tree and the DAG. The container graphical objects include an account1 container 702, a region us-east-1 container 704, a region us-west-1 container 706, a us-east-1a AZ container 708, a us-east-1b AZ container 710, a No AZ container 712, a us-west-1a AZ container 714, a us-west-1b AZ container 716, a No AZ container 718, a vpc-foo VPC container 720, a vpc-bar VPC container 722, a vpc-apples VPC container 724, and a vpc-oranges VPC container 726. The various containers of FIG. 7A represent corresponding parent nodes in the complex and trees. The child graphical objects include subnet graphical objects 728, 730, 732, 734, 736, 738, 740, 742, 744, 746, 748, 750 and an internet gateway graphical object 752 that represent corresponding subnet nodes and an internet gateway node in the complex and trees. The child graphical objects are positioned in intersection areas (not labeled) that represent intersection area nodes in the tree.

The diagram 700A has whitespace areas generally designated at 754 and 756. The whitespace areas 754, 756 include intersection areas unoccupied by child graphical objects. Stated another way, the intersection areas in the whitespace areas 754, 756 are empty. In comparison, the diagram 700A additionally includes occupied areas 758, 560 that generally include intersection areas occupied by one or more child graphical objects. Accordingly, some embodiments described herein may at least partially collapse whitespace in a diagram. The resulting diagram may be more dense and/or aesthetically pleasing to users. An example is described with combined reference to FIGS. 7A and 7B.

Figure 7B:
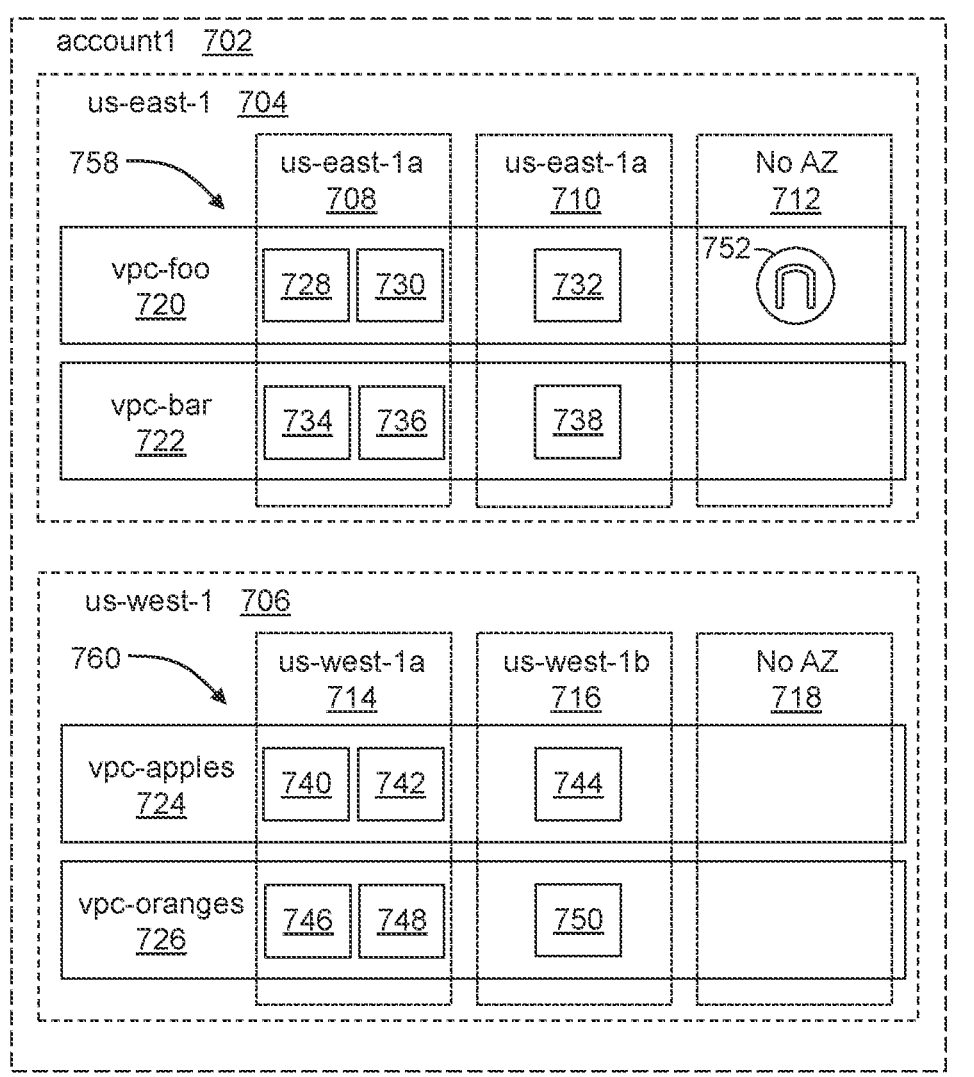
FIG. 7B is another example graphical diagram that may be generated based on the tree of FIG. 7A.

FIG. 7B is another example graphical diagram 700B (hereinafter "diagram 700B") that may be generated based on the tree of FIG. 7A, arranged in accordance with at least one embodiment described herein. The diagram 700B may be displayed to a user, e.g., by outputting the diagram 700B to a display of the client devices 104, 106, 108 of FIG. 1. The diagram 700B includes the same graphical objects as FIG. 7A but in a different arrangement in which the whitespace areas 754, 756 of FIG. 7A have been collapsed.

In FIG. 7A, each of the occupied areas 758, 760 is located entirely within a specific region/VPCs pair that does not overlap the specific region/VPCs pair of the other occupied area. In particular, the occupied area 758 is located entirely within the us-east-1 container 704 and the vpc-foo and vpc-bar VPC containers 720, 722, whereas the occupied area 760 is located entirely within the us-west-1 container 706 and the vpc-apples and vpc-oranges VPC containers 724, 726.

Because each of the whitespace areas 754, 756 is the same size as each of the occupied areas 758, 760, one option to collapse the whitespace is to move one of the occupied areas 758, 760 to one of the whitespace areas 754, 756. For example, the occupied area 760 could be moved to the whitespace area 754 to be below the occupied area 758, or the occupied area 760 could be moved to the whitespace area 754 to be side-by-side with the occupied area 758. Either option may involve one or more of: (1) reducing the width of each of the vpc-foo and vpc-bar VPC containers 720, 722 to end at or near the boundary of the us-east-1 region container 704; (2) reducing the width of each of the vpc-apples and vpc-oranges VPC containers 724, 726 to begin at or near the boundary of the us-west-1 region container 706; (3) reducing heights of each of the us-east-1 container 704, the us-east-1a AZ container 708, the us-east-1b AZ container, and the No AZ container 712 to end at or near the bottom of the vpc-bar VPC container 722; and (4) reducing heights of each of the us-west-1 region container 706, the us-west-1a AZ container 714, the us-west-1b AZ container 716, and the No AZ container 718 to begin at or near the top of the vpc-apples VPC container 724.

As further illustrated in FIG. 7B, the resulting smaller us-west-1 region container 706 (with occupied area 760 and resulting smaller: vpc-apples VPC container 724, vpc-oranges VPC container 726, us-west-1a AZ container 714, us-west-1b AZ container 716, and No AZ container 718) may then be relocated beneath the resulting smaller us-east 1 region container 704 (with occupied area 758 and resulting smaller: vpc-foo VPC container 720, vpc-bar VPC container 722, us-east-1a AZ container 708, us-east-1b AZ container 710, and No AZ container 712). In addition, the dimensions of the account 1 container 702 may be adjusted to accommodate the size- and position-adjusted region containers 704, 706.

Figure 8:
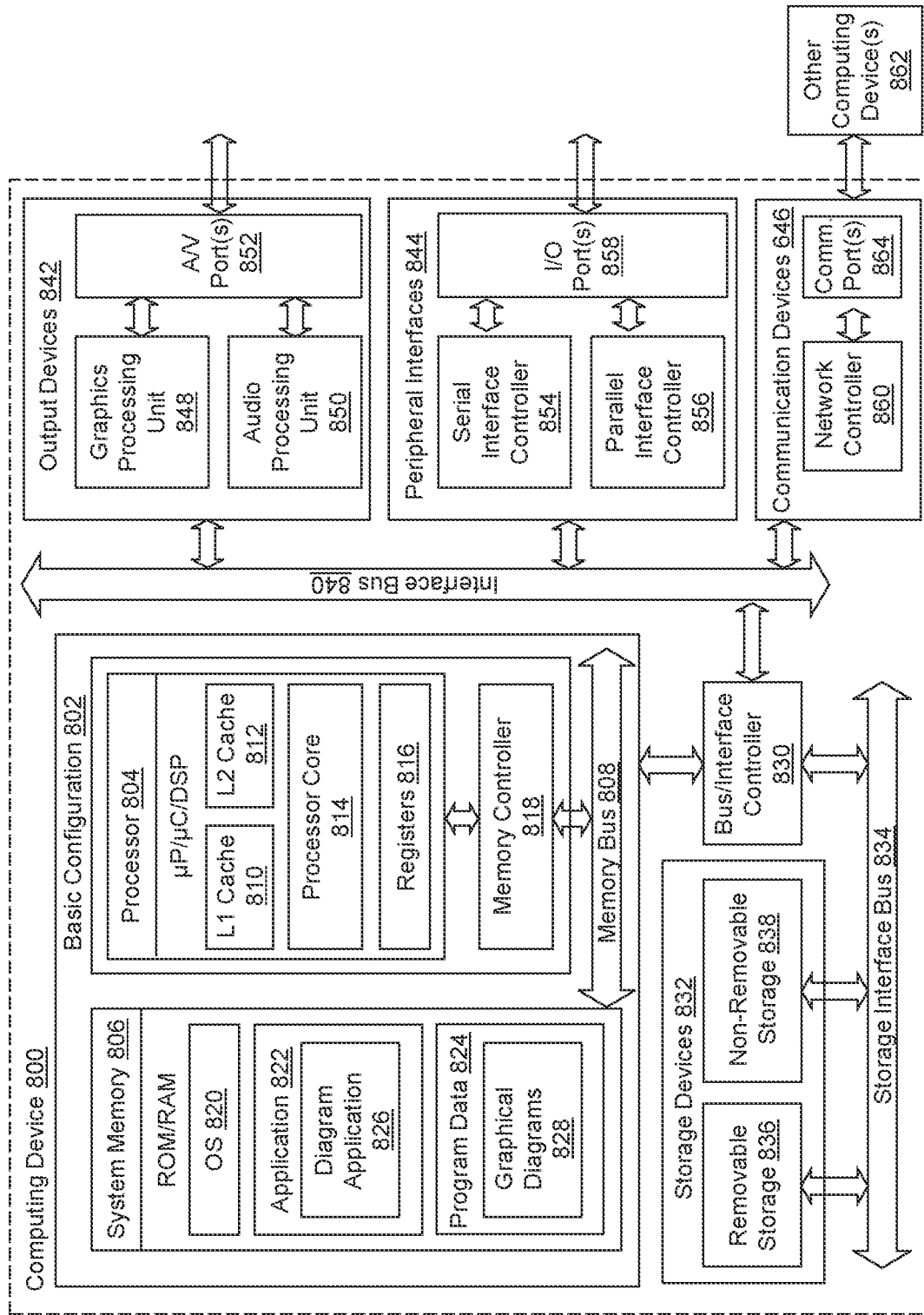
FIG. 8 is a block diagram illustrating an example computing device that is arranged to generate and display graphical diagrams, all arranged in accordance with at least one embodiment described herein.

FIG. 8 is a block diagram illustrating an example computing device 800 that is arranged to generate and display graphical diagrams, arranged in accordance with at least one embodiment described herein. The computing device 800 may include, be included in, or otherwise correspond to either or both of the server 102 or the client devices 104, 106, 108 of FIG. 1. In a basic configuration 802, the computing device 800 typically includes one or more processors 804 and a system memory 806. A memory bus 808 may be used to communicate between the processor 804 and the system memory 806.

Depending on the desired configuration, the processor 804 may be of any type including, but not limited to, a microprocessor (μP), a microcontroller (μC), a digital signal processor (DSP), or any combination thereof. The processor 804 may include one or more levels of caching, such as a level one cache 810 and a level two cache 812, a processor core 814, and registers 816. The processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may include an internal part of the processor 804.

Depending on the desired configuration, the system memory 806 may be of any type including volatile memory (such as RAM), nonvolatile memory (such as ROM, flash memory, etc.), or any combination thereof. The system memory 806 may include an operating system 820, one or more applications 822, and program data 824. The application 822 may include a diagram application 826 that is arranged to generate and display graphical diagrams, as described herein. The diagram application 826 may include, be included in, or otherwise correspond to the application 114 and/or the browser 128 of FIG. 1. The program data 824 may include graphical diagrams 826 (which may include, be included in, or otherwise correspond to the graphical diagrams 126 of FIG. 1) as is described herein, structured source data collections (such as structured source data 120 of FIG. 1), models of structured source data (such as models 122 of FIG. 1) and/or other diagram application data. In some embodiments, the application 822 may be arranged to operate with the program data 824 on the operating system 820 such that one or more methods may be provided as described herein.

The computing device 800 may have additional features or functionality, and additional interfaces to facilitate communications between the basic configuration 802 and any involved devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 806, the removable storage devices 836, and the non-removable storage devices 838 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 800. Any such computer storage media or non-transitory computer-readable media may be part of the computing device 800.

The computing device 800 may also include an interface bus 840 to facilitate communication from various interface devices (e.g., output devices 842, peripheral interfaces 844, and communication devices 846) to the basic configuration 802 via the bus/interface controller 830. The output devices 842 include a graphics processing unit 848 and an audio processing unit 850, which may be configured to communicate to various external devices such as a display or speakers via one or more A/V ports 852. Diagrams, flowcharts, organizational charts, connectors, and/or other graphical objects generated by the diagram application 826 may be output through the graphics processing unit 848 to such a display. The peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. Such input devices may be operated by a user to provide input to the diagram application 826, which input may be effective to, e.g., generate curved connectors, designate points as designated points of one or more curved connectors, relocate one or more designated points, and/or to accomplish other operations within the diagram application 826. The communication devices 846 include a network controller 860, which may be arranged to facilitate communications with one or more other computing devices 882 over a network communication link via one or more communication ports 884.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 800 may be implemented as a portion of a small-form factor portable (or mobile) electronic device such as a smartphone, a personal data assistant (PDA) or an application-specific device. The computing device 800 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to display a graphical diagram, the method comprising:
  receiving source data that includes a plurality of nodes arranged in a directed acyclic graph (DAG) in which each child node of a set of child nodes of the plurality of nodes has multiple DAG parent nodes, the plurality of DAG parent nodes included in the plurality of nodes;

converting the DAG to a tree in which each of the plurality of nodes has no more than one tree parent node; and displaying, based on the tree, a graphical diagram in which child graphical objects that represent child nodes that each has multiple DAG parent nodes are positioned in intersection areas of container graphical objects that represent the DAG parent nodes.

2. The method of claim 1, wherein displaying the graphical diagram based on the tree includes displaying a first child graphical object that represents a first child node having first and second DAG parent nodes in an intersection area of first and second container graphical objects respectively representing the first and second DAG parent nodes.

3. The method of claim 2, wherein:

the intersection area of the first and second container graphical objects is a first intersection area;

the set of child nodes further includes a second child node represented in the graphical diagram by a second child graphical object;

the first and second DAG parent nodes are respectively represented in the graphical diagram by first and second container graphical objects;

the plurality of nodes further includes a third DAG parent node represented in the graphical diagram by a third container graphical object;

the first and second child nodes are at a first level of the DAG;

the first, second, and third DAG parent nodes are at a second level of the DAG immediately above the first level;

the tree has the first and second levels and a third level of nodes between the first level and the second level, the third level of nodes including intersection area nodes including first and second intersection area nodes;

the first child node has the first and second DAG parent nodes as parent nodes in the DAG and the first intersection area node as its only tree parent node in the tree, the first intersection area node represented by the first intersection area at which the first container graphical object intersects the second container graphical object in the graphical diagram such that displaying the graphical diagram based on the tree includes displaying the first graphical object within the first intersection area; and the second child node has the first and third DAG parent nodes as parent nodes in the DAG and the second intersection area node as its only tree parent node in the tree, the second intersection area node represented by a second intersection area at which the first container graphical object intersects the third container graphical object in the graphical diagram such that displaying the graphical diagram based on the tree includes displaying the second graphical object within the second intersection area.

4. The method of claim 3, wherein:

the plurality of nodes further includes a first DAG ancestor node represented in the graphical diagram by a fourth container graphical object and a second DAG ancestor node represented in the graphical diagram by a fifth container graphical object;

each of the first and second DAG ancestor nodes is a direct DAG ancestor node of each of the first and second DAG parent nodes;

displaying the first graphical object within the first intersection area includes displaying the first graphical object within the first intersection area of the first container graphical object and the second container graphical object all within the fourth container graphical object; and displaying the graphical diagram based on the tree further includes displaying a duplicate of at least some of the first container graphical object, the second container graphical object, and the first graphical object within the first intersection area of the first container graphical object and the second container graphical object all within the fifth container graphical object.

5. The method of claim 3, wherein:

the plurality of nodes further includes a third child node at the first level of the DAG, the third child node represented in the graphical diagram by a third child graphical object;

the third child node has a single DAG parent node in the DAG, the single DAG parent node comprising the first DAG parent node; and displaying the graphical diagram based on the tree includes displaying the third child graphical object within the first container graphical object in an area that does not intersect container graphical objects that represent any other parent nodes at the second level of the tree.

6. The method of claim 1, wherein displaying the graphical diagram comprises:

displaying first container graphical objects aligned in a first direction, each of the first container graphical objects representing a different one of a plurality of availability zones (AZs);

displaying second container graphical objects aligned in a second direction and positioned such that each of the second container graphical objects intersects each of the first container graphical objects, each of the second container graphical objects representing a different one of a plurality of virtual private clouds (VPCs); and representing subnets belonging to the set of child nodes as child graphical objects within intersection areas of the first container graphical objects with the second container graphical objects in dependence on a corresponding intersection area node of the tree that is the one tree parent node of the corresponding subnet, each of the subnets having in the DAG both a corresponding one of the AZs as a DAG parent node and a corresponding one of the VPCs as a DAG parent node.

7. The method of claim 1, wherein converting the DAG to the tree comprises:

identifying first and second DAG parent nodes in the DAG that is each a parent node of a first child node of the set of child nodes;

inserting an intersection area node between the first DAG parent node and the first child node in the tree such that the intersection area node is a child node of the first DAG parent node and is the tree parent node of the first child node; and removing a parent relationship of the second DAG parent node to the first child node in the tree.

8. The method of claim 1, further comprising:

laying out a grid of first and second container graphical objects, the first container graphical objects aligned in a row of the grid and the second container graphical objects aligned in a column of the grid such that the row of first container graphical objects intersects the column of second container graphical objects;

allocating child graphical objects that represent child nodes of the set of child nodes into intersection areas of the first container graphical objects with the second container graphical objects based on a pair of a corresponding one of the first container graphical objects and a corresponding one of the second container graphical objects to which each of the child graphical objects belongs;

determining an amount of space to display each of the intersection areas in the corresponding container graphical objects based on the child graphical objects allocated to each of the intersection areas; and in response to determining that a subset of the intersection areas is unoccupied by child graphical objects; condensing the grid by moving one or more intersection areas occupied by one or more child graphical objects to at least some of the subset of intersection areas unoccupied by child graphical objects, wherein displaying the graphical diagram comprises displaying graphical objects according to the condensed grid.

9. A non-transitory computer-readable medium having computer-readable instructions stored thereon that are executable by a processor to perform or control performance of operations comprising:

receiving source data that includes a plurality of nodes arranged in a directed acyclic graph (DAG) in which each child node of a set of child nodes of the plurality of nodes has multiple DAG parent nodes, the plurality of DAG parent nodes included in the plurality of nodes;

converting the DAG to a tree in which each of the plurality of nodes has no more than one tree parent node; and displaying, based on the tree, a graphical diagram in which child graphical objects that represent child nodes that each has multiple DAG parent nodes are positioned in intersection areas of container graphical objects that represent the DAG parent nodes.

10. The non-transitory computer-readable medium of claim 9, wherein displaying the graphical diagram based on the tree includes displaying a first child graphical object that represents a first child node having first and second DAG parent nodes in an intersection area of first and second container graphical objects respectively representing the first and second DAG parent nodes.

11. The non-transitory computer-readable medium of claim 10, wherein:

the intersection area of the first and second container graphical objects is a first intersection area;

the set of child nodes further includes a second child node represented in the graphical diagram by a second child graphical object;

the first and second DAG parent nodes are respectively represented in the graphical diagram by first and second container graphical objects;

the plurality of nodes further includes a third DAG parent node represented in the graphical diagram by a third container graphical object;

the first and second child nodes are at a first level of the DAG;

the first, second, and third DAG parent nodes are at a second level of the DAG immediately above the first level;

the tree has the first and second levels and a third level of nodes between the first level and the second level, the third level of nodes including intersection area nodes including first and second intersection area nodes;

the first child node has the first and second DAG parent nodes as parent nodes in the DAG and the first intersection area node as its only tree parent node in the tree, the first intersection area node represented by the first intersection area at which the first container graphical object intersects the second container graphical object in the graphical diagram such that displaying the graphical diagram based on the tree includes displaying the first graphical object within the first intersection area; and the second child node has the first and third DAG parent nodes as parent nodes in the DAG and the second intersection area node as its only tree parent node in the tree, the second intersection area node represented by a second intersection area at which the first container graphical object intersects the third container graphical object in the graphical diagram such that displaying the graphical diagram based on the tree includes displaying the second graphical object within the second intersection area.

12. The non-transitory computer-readable medium of claim 11, wherein:

the plurality of nodes further includes a first DAG ancestor node represented in the graphical diagram by a fourth container graphical object and a second DAG ancestor node represented in the graphical diagram by a fifth container graphical object;

each of the first and second DAG ancestor nodes is a direct DAG ancestor node of each of the first and second DAG parent nodes;

displaying the first graphical object within the first intersection area includes displaying the first graphical object within the first intersection area of the first container graphical object and the second container graphical object all within the fourth container graphical object; and displaying the graphical diagram based on the tree further includes displaying a duplicate of at least some of the first container graphical object, the second container graphical object, and the first graphical object within the first intersection area of the first container graphical object and the second container graphical object all within the fifth container graphical object.

13. The non-transitory computer-readable medium of claim 11, wherein:

the plurality of nodes further includes a third child node at the first level of the DAG, the third child node represented in the graphical diagram by a third child graphical object;

the third child node has a single DAG parent node in the DAG, the single DAG parent node comprising the first DAG parent node; and displaying the graphical diagram based on the tree includes displaying the third child graphical object within the first container graphical object in an area that does not intersect container graphical objects that represent any other parent nodes at the second level of the tree.

14. The non-transitory computer-readable medium of claim 9, wherein displaying the graphical diagram comprises:

displaying first container graphical objects aligned in a first direction, each of the first container graphical objects representing a different one of a plurality of availability zones (AZs);

displaying second container graphical objects aligned in a second direction and positioned such that each of the second container graphical objects intersects each of the first container graphical objects, each of the second container graphical objects representing a different one of a plurality of virtual private clouds (VPCs); and representing subnets belonging to the set of child nodes as child graphical objects within intersection areas of the first container graphical objects with the second container graphical objects in dependence on a corresponding intersection area node of the tree that is the one tree parent node of the corresponding subnet, each of the subnets having in the DAG both a corresponding one of the AZs as a DAG parent node and a corresponding one of the VPCs as a DAG parent node.

15. The non-transitory computer-readable medium of claim 9, wherein converting the DAG to the tree comprises:

identifying first and second DAG parent nodes in the DAG that is each a parent node of a first child node of the set of child nodes;

inserting an intersection area node between the first DAG parent node and the first child node in the tree such that the intersection area node is a child node of the first DAG parent node and is the tree parent node of the first child node; and removing a parent relationship of the second DAG parent node to the first child node in the tree.

16. The non-transitory computer-readable medium of claim 9, the operations further comprising:

laying out a grid of first and second container graphical objects, the first container graphical objects aligned in a row of the grid and the second container graphical objects aligned in a column of the grid such that the row of first container graphical objects intersects the column of second container graphical objects;

allocating child graphical objects that represent child nodes of the set of child nodes into intersection areas of the first container graphical objects with the second container graphical objects based on a pair of a corresponding one of the first container graphical objects and a corresponding one of the second container graphical objects to which each of the child graphical objects belongs;

determining an amount of space to display each of the intersection areas in the corresponding container graphical objects based on the child graphical objects allocated to each of the intersection areas; and in response to determining that a subset of the intersection areas is unoccupied by child graphical objects; condensing the grid by moving one or more intersection areas occupied by one or more child graphical objects to at least some of the subset of intersection areas unoccupied by child graphical objects, wherein displaying the graphical diagram comprises displaying graphical objects according to the condensed grid.

17. A system to display a graphical diagram, the system comprising:

a processor;

a non-transitory computer-readable medium communicatively coupled to the processor and having computer-readable instructions stored thereon that are executable by the processor to perform or control performance of operations comprising:

receiving source data that includes a plurality of nodes arranged in a directed acyclic graph (DAG) in which each child node of a set of child nodes of the plurality of nodes has multiple DAG parent nodes, the plurality of DAG parent nodes included in the plurality of nodes;

converting the DAG to a tree in which each of the plurality of nodes has no more than one tree parent node; and displaying, based on the tree, a graphical diagram in which child graphical objects that represent child nodes that each has multiple DAG parent nodes are positioned in intersection areas of container graphical objects that represent the DAG parent nodes.

18. The system of claim 17, wherein displaying the graphical diagram based on the tree includes displaying a first child graphical object that represents a first child node having first and second DAG parent nodes in an intersection area of first and second container graphical objects respectively representing the first and second DAG parent nodes.

19. The system of claim 18, wherein:

the intersection area of the first and second container graphical objects is a first intersection area;

the set of child nodes further includes a second child node represented in the graphical diagram by a second child graphical object;

the first and second DAG parent nodes are respectively represented in the graphical diagram by first and second container graphical objects;

the plurality of nodes further includes a third DAG parent node represented in the graphical diagram by a third container graphical object;

the first and second child nodes are at a first level of the DAG;

the first, second, and third DAG parent nodes are at a second level of the DAG immediately above the first level;

the tree has the first and second levels and a third level of nodes between the first level and the second level, the third level of nodes including intersection area nodes including first and second intersection area nodes;

the first child node has the first and second DAG parent nodes as parent nodes in the DAG and the first intersection area node as its only tree parent node in the tree, the first intersection area node represented by the first intersection area at which the first container graphical object intersects the second container graphical object in the graphical diagram such that displaying the graphical diagram based on the tree includes displaying the first graphical object within the first intersection area; and the second child node has the first and third DAG parent nodes as parent nodes in the DAG and the second intersection area node as its only tree parent node in the tree, the second intersection area node represented by a second intersection area at which the first container graphical object intersects the third container graphical object in the graphical diagram such that displaying the graphical diagram based on the tree includes displaying the second graphical object within the second intersection area.

20. The system of claim 19, wherein:

the plurality of nodes further includes a first DAG ancestor node represented in the graphical diagram by a fourth container graphical object and a second DAG ancestor node represented in the graphical diagram by a fifth container graphical object;

each of the first and second DAG ancestor nodes is a direct DAG ancestor node of each of the first and second DAG parent nodes;

displaying the first graphical object within the first intersection area includes displaying the first graphical object within the first intersection area of the first container graphical object and the second container graphical object all within the fourth container graphical object; and displaying the graphical diagram based on the tree further includes displaying a duplicate of at least some of the first container graphical object, the second container graphical object, and the first graphical object within the first intersection area of the first container graphical object and the second container graphical object all within the fifth container graphical object.

21. The system of claim 19, wherein:

the plurality of nodes further includes a third child node at the first level of the DAG, the third child node represented in the graphical diagram by a third child graphical object;

the third child node has a single DAG parent node in the DAG, the single DAG parent node comprising the first DAG parent node; and displaying the graphical diagram based on the tree includes displaying the third child graphical object within the first container graphical object in an area that does not intersect container graphical objects that represent any other parent nodes at the second level of the tree.

22. The system of claim 17, wherein displaying the graphical diagram comprises:

displaying first container graphical objects aligned in a first direction, each of the first container graphical objects representing a different one of a plurality of availability zones (AZs);

displaying second container graphical objects aligned in a second direction and positioned such that each of the second container graphical objects intersects each of the first container graphical objects, each of the second container graphical objects representing a different one of a plurality of virtual private clouds (VPCs); and representing subnets belonging to the set of child nodes as child graphical objects within intersection areas of the first container graphical objects with the second container graphical objects in dependence on a corresponding intersection area node of the tree that is the one tree parent node of the corresponding subnet, each of the subnets having in the DAG both a corresponding one of the AZs as a DAG parent node and a corresponding one of the VPCs as a DAG parent node.

23. The system of claim 17, wherein converting the DAG to the tree comprises:

identifying first and second DAG parent nodes in the DAG that is each a parent node of a first child node of the set of child nodes;

inserting an intersection area node between the first DAG parent node and the first child node in the tree such that the intersection area node is a child node of the first DAG parent node and is the tree parent node of the first child node; and removing a parent relationship of the second DAG parent node to the first child node in the tree.

24. The system of claim 17, the operations further comprising:

laying out a grid of first and second container graphical objects, the first container graphical objects aligned in a row of the grid and the second container graphical objects aligned in a column of the grid such that the row of first container graphical objects intersects the column of second container graphical objects;

allocating child graphical objects that represent child nodes of the set of child nodes into intersection areas of the first container graphical objects with the second container graphical objects based on a pair of a corresponding one of the first container graphical objects and a corresponding one of the second container graphical objects to which each of the child graphical objects belongs;

determining an amount of space to display each of the intersection areas in the corresponding container graphical objects based on the child graphical objects allocated to each of the intersection areas; and in response to determining that a subset of the intersection areas is unoccupied by child graphical objects; condensing the grid by moving one or more intersection areas occupied by one or more child graphical objects to at least some of the subset of intersection areas unoccupied by child graphical objects, wherein displaying the graphical diagram comprises displaying graphical objects according to the condensed grid.

* * * * *